United States Patent [19]

Marturano et al.

[11] Patent Number: 5,430,743
[45] Date of Patent: Jul. 4, 1995

[54] METHOD AND APPARATUS FOR RECOVERING DATA IN A RADIO COMMUNICATION SYSTEM

[75] Inventors: Lawrence J. Marturano, Mt. Prospect, Ill.; Daehyoung Hong, Seoul, Rep. of Korea

[73] Assignee: Motorola, Inc., Schaumburg, Ill.

[21] Appl. No.: 84,052

[22] Filed: Jun. 29, 1993

[51] Int. Cl.$^6$ ............... G06F 11/00; H03M 13/00
[52] U.S. Cl. .................... 371/43; 371/5.5; 371/41; 379/75
[58] Field of Search ............. 371/5.1, 5.5, 37.8, 371/37.9, 41, 43, 44, 45; 375/75, 80, 39

[56] References Cited

U.S. PATENT DOCUMENTS

| | | | |
|---|---|---|---|
| 4,541,091 | 9/1985 | Nishida et al. | 371/39 |
| 4,701,923 | 10/1987 | Fukasawa et al. | 371/41 |
| 4,878,228 | 10/1989 | Takahashi | 375/3 |
| 4,991,164 | 2/1991 | Casiraghi et al. | 370/17 |
| 5,148,431 | 9/1992 | Hayashi | 371/5.1 |
| 5,218,622 | 6/1993 | Fazel et al. | 371/37.1 |
| 5,287,544 | 2/1994 | Menich et al. | 455/33.1 |
| 5,293,641 | 3/1994 | Kallin et al. | 455/33.1 |
| 5,299,070 | 3/1994 | Takahashi et al. | 371/41 |
| 5,321,725 | 6/1994 | Paik et al. | 375/39 |
| 5,325,397 | 6/1994 | Scholz et al. | 375/10 |
| 5,335,356 | 8/1994 | Anderson | 455/54.1 |
| 5,363,408 | 11/1994 | Paik et al. | 375/39 |
| 5,371,471 | 12/1994 | Chennakeshu et al. | 375/14 |

OTHER PUBLICATIONS

Raviraj et al., "Adaptive Coding for Conversational Speech Communication", IEEE, pp. 344-348.

Alamouti, "Adaptive Trellis-Coded Multiple-Phase-Shift Keying for Rayleigh Fading Channels", 1994 IEEE, pp. 2305-2314.

Femenias, "A Slow Frequency Hopping TEM-8PSK Adaptive RSSE Receiver for TDMA Wideband Cellular-Mobile Radio", IEEE 1992, pp. 409-412.

Fettweis et al., "Parallel Viterbi Algorithm Implementation: Breaking the ACS-Bottleneck", 1989 IEEE, pp. 785-790.

*Primary Examiner*—Robert W. Beausoliel, Jr.
*Assistant Examiner*—Albert Décady
*Attorney, Agent, or Firm*—James A. Coffing

[57] ABSTRACT

A radio communication system receiver employs a demodulator (104) to recover a received signal. The receiver of the present invention further includes a channel quality estimator (222) for estimating a characteristic of the communication channel over which the signal is received. A first or second decoding technique (220) is selectively employed using the estimated communication channel quality value (223). In this manner, an improved receiver is provided that is able to realize the benefits of either the first or the second decoding technique, depending the channel condition.

20 Claims, 2 Drawing Sheets

METHOD AND APPARATUS FOR RECOVERING DATA IN A RADIO COMMUNICATION SYSTEM

FIELD OF THE INVENTION

The present invention relates generally to radio communication systems, and in particular to such systems that provide error protection in the transmitted data to facilitate improved bit error rate (BER) performance during recovery of the transmitted data.

BACKGROUND OF THE INVENTION

Voice communication systems are well known in the art. Pursuant to many such systems, an information signal—which may comprise a plurality of discrete data elements—is modulated into a carrier signal and transmitted from a first location to a second location. At the second location, the information signal is demodulated and recovered. One of the goals of such communication systems is to place a high number of voice channels within a given radio frequency (RF) channel bandwidth while maintaining acceptable speech quality.

In a digital radio communication system, an input speech waveform is sampled, encoded, and transmitted through a digital radio communication channel. To achieve higher spectrum efficiency, be input speech is preferably coded into the lowest possible bit rate while still maintaining acceptable speech quality. It is generally known that speech quality is determined, at least in part, by the bit error sensitivity of the coded speech bits. When input speech is coded at lower bit rates for higher spectral efficiency, recovered speech quality is highly sensitive to bit errors in some of the encoded bits. Further, bits generated by speech coding (e.g., vector sum excited linear prediction, or VSELP) have the characteristic of non-uniform sensitivity to errors. Expressed another way, some bits in the data stream are more important (i.e., as compared to other bits in the same data stream) to the resultant speech quality, and are therefore considered more sensitive than those other bits.

In a typical voice communication system, the input analog speech is first encoded using a known low bit rate source coding technique (e.g. VSELP). The resultant data elements (typically bits) are then typically channel coded prior to transmission. Channel coding consists of adding additional information content to the data elements produced by the source coder to provide a certain degree of immunity to errors. In order to preserve spectral efficiency, it is desirable to minimize this added overhead as much as possible, while still providing adequate error protection. Channel coding typically involves a partitioning of the input data into two or more groups based on their sensitivity, which characteristic is described above. The most sensitive group of data elements is then typically further processed by encoding it with a so-called block error control code, as later described, for error detection and/or correction when decoding. The resulting information is then typically coded using another well known coding technique (e.g., a convolutional or trellis code) to further protect against errors.

Based on the error detection indication yielded by the block code, further processing, termed error mitigation, may be done on the decoded information to perceptually mask known errors in the most important bits. It is well known that the accuracy of the error detection or correction decision made by the block code is very important to reconstructed voice quality.

Block error control codes used for the error detection and correction are designed to map one set of discrete data elements into another set of discrete data elements, or codewords, which differ from each other in at least D elements. Further, selection of a particular coding scheme results in a trade-off between error detecting and error correcting. That is, depending upon the method of decoding selected at the design phase, a higher error correcting capability may be gained, but only at the expense of reduced error detection, and vice-versa. For example, a block code having $D=10$ might be used to detect all combinations of 9 or fewer errors, while performing no correction. Similarly, the same coding system might be used to simultaneously correct combinations of 3 or fewer errors, while detecting combinations of 6 or fewer errors.

It is well established that the choice of a block code is dependent upon the bit error rate (BER) of the channel over which it is used. That is, over a very poor quality channel (i.e., where BER is relatively high), it may be desirable to use a block code which has a very good error detection ability at the expense of error correction, since the likelihood of incorrect decoding is high. As an example, using the 3-error correcting code described above, combinations of 7 or more errors out of 10 go undetected. Thus, for a very poor channel, or one in which errors occur in bursts, this code would be a poor choice.

Conversely, for a good channel (i.e., where BER is relatively low), which induces only occasional errors, it would be desirable to use a block code having better error correction, where the likelihood of successful correction is high. As an example, if no more than 2 errors are expected out of every 10 symbols, the 3-error correcting code described above would be desirable.

Unfortunately, the mobile radio channel is characterized by time varying channel quality, depending upon such variables as mobile speed, elevation, and distance from the base transceiver. Accordingly, the BER experienced over such a channel varies greatly with time. In particular, the time-averaged BER generally rises as the distance from the base transceiver increases, though larger, instantaneous BER fluctuations might occur as a function of any of the above-mentioned factors.

Today's radio communication systems employ fixed block codes that perform reasonably well over the range of BER expected over the mobile radio channel. However, with the time varying nature of the mobile radio channel, fixed channel coding schemes result in an undesirable tradeoff between error detection and correction. That is, these fixed codes either sacrifice needed error detection capability under high BER conditions—thereby reducing coverage of the voice communication system—or sacrifice desirable error correction at lower BER conditions—thereby sacrificing quality within the coverage area of the voice communication system—or both. As a result, voice quality is compromised under BER conditions that are outside the expected range—either higher or lower.

Accordingly, there exists the need four a spectrally efficient digital communication system employing a channel decoder which provides both good error detection and correction of error sensitive information under varying BER conditions. Preferably, such a solution would maintain the spectral efficiency afforded by low bit rate source coding, without adding to the channel coding overhead.

DETAILED DESCRIPTION OF THE PREFERRED EMBODIMENT

The present invention encompasses a channel decoding method and apparatus for use in a radio communication system. In a preferred embodiment of the invention, a source encoded information element stream is recovered from a demodulated communication signal. The demodulated signal consists of channel encoded speech data elements, at least a first group of which have been encoded using a block code for error detection and error correction. Using an estimate of the channel quality, the channel decoder determines how best to decode the block code in order to obtain the best likelihood of correct error detection and correction.

Figure 1:
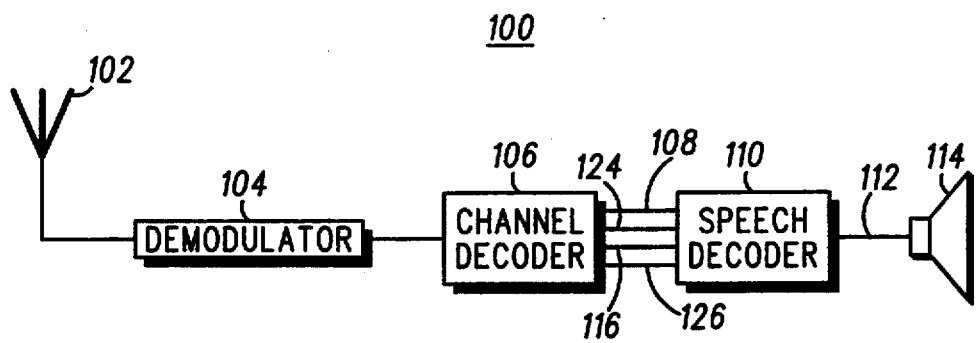
FIG. 1 shows a radio communication system receiver, in accordance with the present invention.

FIG. 1 shows a simplified block diagram of a communication system receiver (100), in accordance with the present invention. A radio frequency signal is received by the antenna (102), and is input to the demodulator (104), which outputs the demodulated data symbols for input to the channel decoder (106), as later described. Source information elements, composed of Group 1 (124), Group 2 (116) and Group 3 (108) speech encoded bits, as well as the error detection flag (126), are inputted to the speech decoder (110), as later described. The speech decoder (110) produces an analog voice signal (112) that is output to a speaker (114), thereby resulting in audio speech perceived by the operator.

Figure 2:
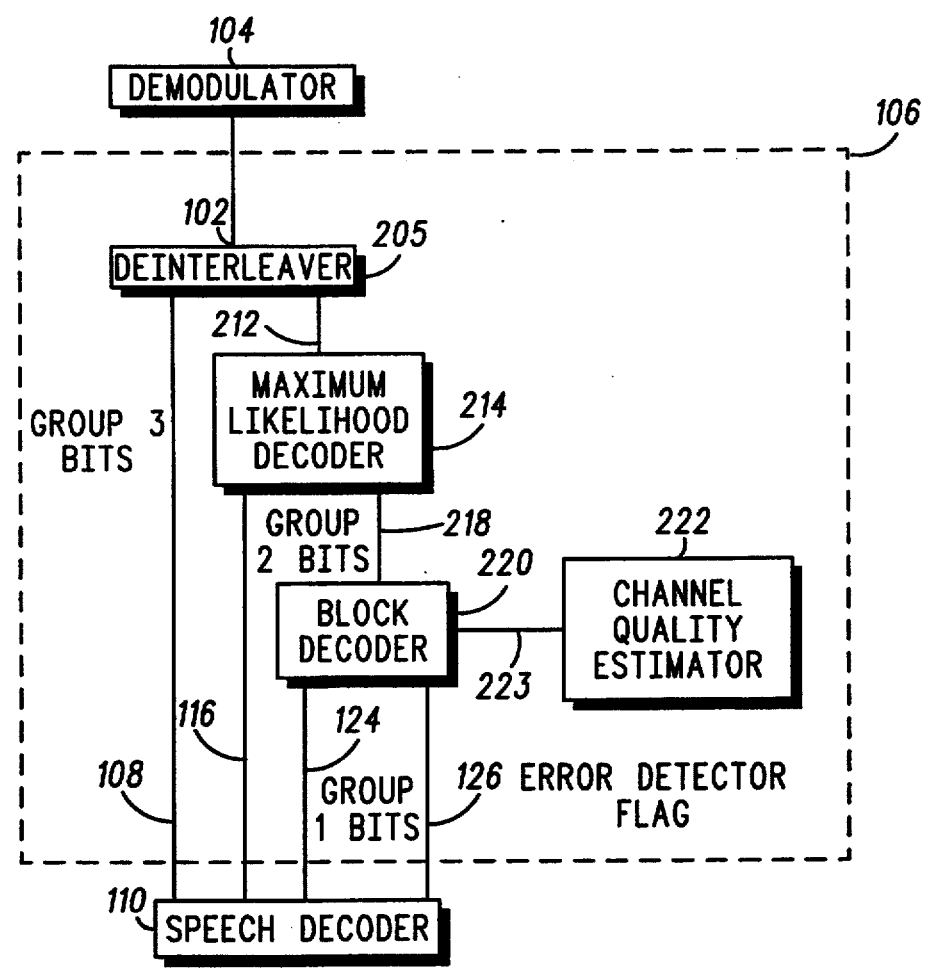
FIG. 2 shows a more detailed depiction of the channel decoder shown in FIG. 1.

FIG. 2 shows a more detailed depiction of the channel decoder (106), in accordance with the present invention. Demodulated data symbols (102) are presented to the channel decoder (106) from the demodulator (104), and comprise the data symbols originating at the transmitter, possibly corrupted by errors due to noise and distortion on the transmission channel. The demodulator (104) may also output channel state information symbols—not shown—associated with these demodulated data symbols (102) which may be employed in the decoding process, as is well understood in the art.

In a preferred embodiment, the demodulated data symbols (102) are input to a deinterleaver (205), which reorders the demodulated data symbols and partitions the symbols into groups. One group comprises the least error sensitive source-encoded bits, termed Group 3 bits (108), to which no channel coding has been added. These bits are input to the speech decoder (110). A second group of the data symbols is composed of trellis encoded data symbols (212). Trellis coding techniques are well known in the art, such as that described in Ungerboeck, *Trellis Coded Modulation with Redundant Signal Sets*, IEEE Communications Magazine, February, 1987, Volume 25, Number 2, pages 5–11. These symbols (212) are input to a maximum likelihood decoder (214; e.g., Viterbi decoder) to recover the encoded bits. The maximum likeliihood decoder (214) outputs the next least error sensitive group of bits, termed Group 2 bits (116) to the speech decoder (110).

The maximum likelihood decoder (214) also outputs a codeword (218) comprising the most sensitive bits, termed Group 1, encoded with a block code. The block code used in the preferred embodiment is a Bose, Chadhuri and Hocquenghen (BCH) code—which technique is well known in the art and described in Peterson, *Encoding and Error Correction Procedures for the Base-Chadhuri Codes*, IRE Transactions on Information Theory, September, 1960, pages 459–470. When decoded as a BCH code, this code can be used to correct all combinations of 2 or less bit errors, while simultaneously detecting all combinations of 2 or less errors in 31 bits. Alternatively, the codewords may be decoded as a simple CRC error detecting code to detect all combinations of 4 or less errors, with no error correction. A block decoder (220) operates to decode the codewords (218) in one of these two ways, dspending on the output of a channel quality estimator (222). Although a preferred embodiment entails decoding the codewords (218) in one of two ways, it is recognized that a skilled artisan could make use of more than two decoding techniques. That is, the present invention could be embodied using multiple decoding techniques, dependent only on the block code chosen at the design phase.

The channel quality estimator (222) outputs a channel quality estimate signal (223) related to the quality of the channel (e.g., as measured by BER). Such estimators are well known in the art, for example as in U.S. Pat. No. 5,113,400, assigned to Motorola, Inc. When the estimator (222) indicates that the channel quality is relatively good, the block decoder attempts to correct Group 1 bit errors by using BCH decoding on the input codeword (218). However, if the estiimator (222) indicates that the channel quality is not sufficiently high to make successful correction likely, the block decoder (220) uses the codewords as a CRC check, and does not attempt error correction. The decoding decision is made by applying a threshold on the channel quality estimate signal (223). If the channel quality estimate signal is greater than this threshold, the channel quality is deemed sufficiently good to use the B0H decoding method. Otherwise, the channel quality is estimated to be poor, and the CRC decoding method is used instead. The threshold put on the channel quality estimate signal (223) may be fixed, or it may be adjusted based on the channel quality estimate signal itself, or other known information regarding the channel state. Whichever decodiing method is used, the block decoder (220) outputs the Group 1 bits (124) to the speech decoder (110), and also provides it with an error detection flag (126) to facilitate error mitigation, in accordance with the present invention.

Figure 3:
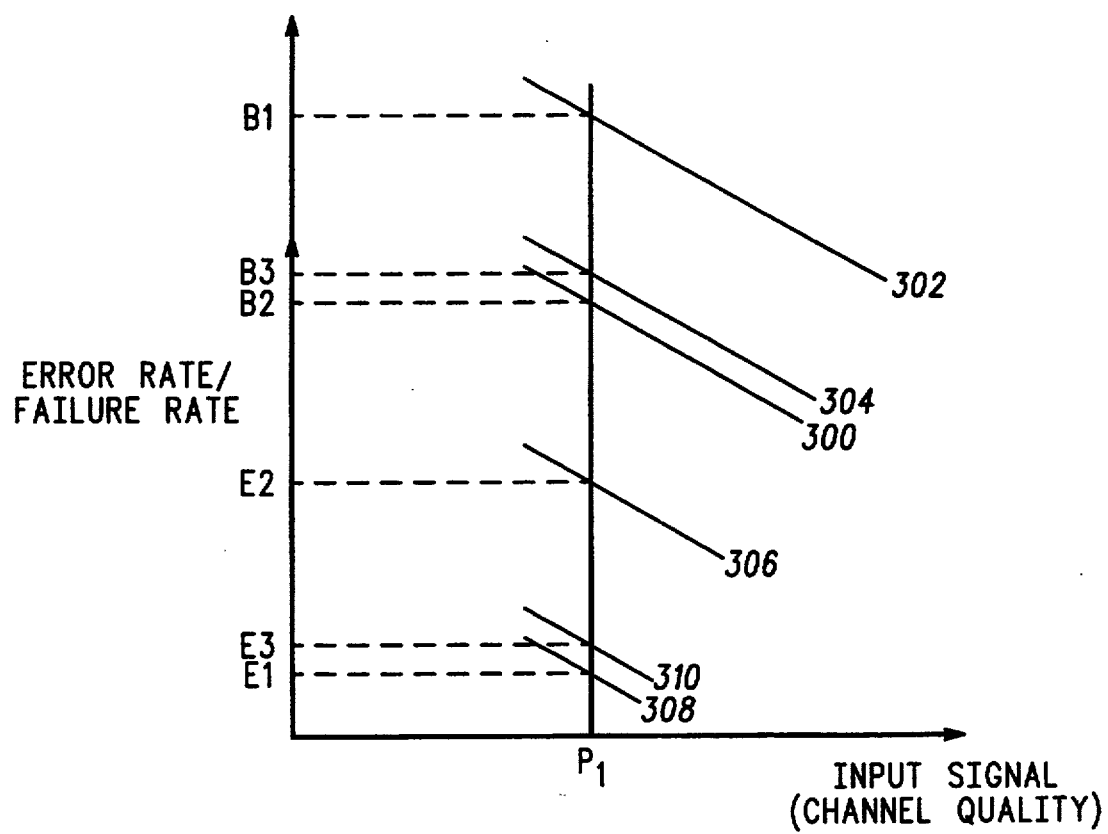
FIG. 3 shows a graphiical representation depicting a comparison of bit error rates and error detection failure rates for three channel decoding schemes.

The channel decoder (100) of the present invention operates to realize virtually all of the error correcting capabilities of the aforementioned BCH code, while also realizing the error detecting capabilities of CRC code. To illustrate, FIG. 3 shows a qualitative comparison of the BER and the error detection failure rate of the most perceptually important (i.e., those bits whose contribution to the quality of the reconstructed audio is high) Group 1 bits under three conditions: 1) the BCH code when used alone; 2) the CRC code when used alone; and 3) the channel decoder of the present invention. Curve 300 shows the BER as a function of the time-averaged channel quality as measured by the input signal power, for a channel decoder using a BCH code at all times. Curve 302 shows a similar curve for a channel decoder using a CRC code at all times. Curve 304 shows another similar curve for the channel decoder of the present invention, which uses the BCH or CRC code depending on the channel quality estimate. Note that for a given channel quality P1, the BER is higher for the channel decoder using the CRC code at all times (B1) than for the channel decoder using the BCH code at all times (B2), since no error correction is performed in the CRC channel decoder. The BER for the channel decoder of the present invention (B3) is significantly better than the BER for the channel decoder using the CRC code at all times, since the present invention allows error correction in accordance with the BCH code when channel conditions warrant.

Curve 306 shows the error detection failure rate for a channel decoder using the BCH code at all times. Curve 308 shows a similar curve for a channel decoder using the CRC code at all times. Curve 310 shows another similar curve for the channel decoder of the present invention. The error detection failure rate is a measure of how often the block code (e.g. CRC or BCH) fails to detect errors in the block codewords (118). [It should be noted that for signal quality P1, the error detection failure rate is lower for a channel decoder using the CRC code at all times (E1) than for a channel decoder using the BCH code at all times (E2), since the CRC code is capable of detecting more combinations of errors than the BCH code; i.e., it is said to have a stronger error detecting capability.] The channel decoder of the present invention has an error detection failure rate E3—significantly lower than the error detection failure of a channel decoder using the BCH code at all times. As shown, the channel decoder of the present invention operates to obtain BER performance similar to the BCH code, while maintaining the error detection capability of the CRC code. It is well known in the art that voice quality is directly related to the bit error rate and error detection failure rate of the so-called Group 1 bits. Thus, the channel decoder of the present invention yields an improvement in voice quality over a channel decoder that employs either the BCH or the CRC block code alone.

Accordingly, by channel decoding the block code based on a channel quality estimate, the present invention operates to provide better voice quality, even in high BER environments, than would be possible with a conventional channel decoder. Similarly, the instant invention allows a communications receiver (100) to operate in a higher BER environment, while still maintaining acceptable voice quality, than a communication receiver employing conventional block decoding methods.

What is claimed is:

1. A radio communication system receiver, comprising:
    A) means for demodulating a signal presently received over a communication channel, to produce a presently received demodulated signal;
    B) means for estimating a present characteristic of the communication channel to produce a present estimated communication channel characteristic;
    C) means for decoding receiver demodulated signals using a first decoding technique; and
    D) means for using the present estimated communication channel characteristic to switch from the first decoding technique to a second decoding technique, to thereby decode the presently received demodulated signal.

2. The radio communication system receiver of claim 1, wherein the means for demodulating comprises a 16-quadrature amplitude modulation (16-QAM) demodulator.

3. The radio communication system receiver of claim 1, wherein the means for estimating a characteristic comprises means for determining a bit error rate (BER) value for the communication channel.

4. The radio communication system receiver of claim 1, wherein the means for estimating a characteristic comprises means for determining a strength of the signal received over the communication channel.

5. The radio communication system receiver of claim 1, wherein the means for estimating a characteristic comprises means for determining a carrier-to-interference (C/I) ratio for the communication channel.

6. The radio communication system receiver of claim 1, wherein the first decoding technique comprises a cyclic redundancy check (CRC) technique.

7. The radio communication system receiver of claim 1, wherein the second decoding technique comprises a Bose-Chadhuri-Hocquenghen (BCH) technique.

8. The radio communication system receiver of claim 1, wherein the first decoding technique comprises a cyclic redundancy check (CRC) technique and the second decoding technique comprises a Bose-Chadhuri-Hocquenghen (BCH) technique.

9. The radio communication system receiver of claim 1, wherein the means for using comprises means for using a predetermined threshold.

10. The radio communication system receiver of claim 1, wherein the means for using comprises means for using a threshold that is a function of the estimated communication channel characteristic.

11. A receiver for use in a 16-QAM digital radio communication system, comprising:
    A) means for demodulating a 16-QAM signal presently received over a communication channel, to produce a presently received demodulated signal;
    B) means for determining a present bit error rate (BER) value for the communication channel;
    C) means for decoding received demodulated signals using a first decoding technique; and
    D) means for using the present BER value to switch from the first decoding technique to a second decoding technique, to thereby decode the presently received a modulated signal.

12. The radio communication system receiver of claim 11, wherein the first decoding technique comprises a cyclic redundancy check (CRC) technique.

13. The radio communication system receiver of claim 11, wherein the second decoding technique comprises a Bose-Chadhuri-Hocquenghen (BCH) technique.

14. The radio communication system receiver of claim 11, wherein the first decoding technique comprises a cyclic redundancy check (CRC) technique and the second decoding technique comprises a Bose-Chadhuri-Hocquenghen (BCH) technique.

15. The radio communication system receiver of claim 11, wherein the means for using comprises means for using a predetermined threshold.

16. A method of recovering data in a radio communication system receiver, the method comprising the steps of:
    A) demodulating a signal presently received over a communication channel, to produce a presently received demodulated signal;

B) estimating a present characteristic of the communication channel to produce a present estimated communication channel characteristic;

C) decoding demodulated signals using a first decoding technique; and

D) using the present estimated communication channel characteristic to switch from the first decoding technique to a second decoding technique to thereby decode the presently received modulated signal.

17. The method of claim 16, wherein the step of using comprises the step of comparing the present estimated communication channel characteristic with a predetermined threshold.

18. The method of claim 16, wherein the step of using comprises the step of comparing the present estimated communication channel characteristic with a threshold that is a function of the present estimated communication channel characteristic.

19. The method of claim 16, wherein the step of using comprises the step of comparing the present estimated communication channel characteristic with a threshold that is based, at least in part, on channel state information other than the present estimated communication channel characteristic.

20. The method of claim 16, further comprising the step of providing an error detection signal that is usable to facilitate error mitigation on the presently received demodulated signal.

* * * * *